US011366300B2

(12) United States Patent
Tang et al.

(10) Patent No.: US 11,366,300 B2
(45) Date of Patent: Jun. 21, 2022

(54) STIMULATED EMISSION DEPLETION SUPER-RESOLUTION MICROSCOPE USING QUICK COMBINATION OF LIGHT BEAMS

(71) Applicants: SUZHOU INSTITUTE OF BIOMEDICAL ENGINEERING AND TECHNOLOGY, CHINESE ACADEMY OF SCIENCES, Suzhou (CN); SUZHOU GUOKE MEDICAL TECHNOLOGY DEVELOPMENT (GROUP) CO., LTD., Suzhou (CN)

(72) Inventors: Yuguo Tang, Suzhou (CN); Yunhai Zhang, Suzhou (CN); Tongda Wei, Suzhou (CN); Jian Chang, Suzhou (CN); Haomin Yang, Suzhou (CN); Lin Ji, Suzhou (CN)

(73) Assignees: SUZHOU INSTITUTE OF BIOMEDICAL ENGINEERING AND TECHNOLOGY, CHINESE ACADEMY OF SCIENCES, Suzhou (CN); SUZHOU GUOKE MEDICAL TECHNOLOGY DEVELOPMENT (GROUP) CO., LTD, Suzhou (CN)

(\*) Notice: Subject to any disclaimer, the term of this patent is extended or adjusted under 35 U.S.C. 154(b) by 85 days.

(21) Appl. No.: 17/067,779

(22) Filed: Oct. 12, 2020

(65) Prior Publication Data
US 2021/0026122 A1    Jan. 28, 2021

Related U.S. Application Data

(63) Continuation of application No. PCT/CN2018/117616, filed on Nov. 27, 2018.

(30) Foreign Application Priority Data

Sep. 21, 2018 (CN) .......................... 201811108256.9

(51) Int. Cl.
G02B 21/06    (2006.01)
G02B 21/00    (2006.01)
G01N 21/64    (2006.01)

(52) U.S. Cl.
CPC ..... *G02B 21/0072* (2013.01); *G01N 21/6458* (2013.01); *G02B 21/0032* (2013.01); *G02B 21/0076* (2013.01)

(58) Field of Classification Search
CPC ........... G02B 21/0072; G02B 21/0032; G02B 21/0076; G02B 21/00; G02B 21/0004;
(Continued)

(56) References Cited

U.S. PATENT DOCUMENTS

2005/0078363 A1    4/2005  Gugel
2005/0213202 A1    9/2005  Hoffmann
2021/0041363 A1*   2/2021  Zhang ................ G02B 21/0072

FOREIGN PATENT DOCUMENTS

CN    102661938 A    9/2012
CN    103698309 A    4/2014
(Continued)

OTHER PUBLICATIONS

International Search Report issued in corresponding International application No. PCT/CN2018/117616, dated Apr. 28, 2019(9 pages).
(Continued)

*Primary Examiner* — Arnel C Lavarias

(57) ABSTRACT

A STED super-resolution microscope capable of quick beam combination is disclosed, which includes a STED imaging unit and a beam combination test unit. The excitation light and the depletion light are accurately combined by the beam combination test unit, so that the imaging light spots of the two light beams passing through the STED imaging unit can accurately coincide with each other, thereby obtaining a better super-resolution imaging effect.

5 Claims, 2 Drawing Sheets

(58) Field of Classification Search
CPC .............. G02B 21/002; G02B 21/0024; G02B 21/0036; G02B 21/0048; G02B 21/0052; G02B 21/006; G02B 21/06; G02B 21/36; G02B 21/361; G01N 21/6458; G01N 21/64; G01N 21/6428; G01N 21/6456; G01N 2021/6463
USPC ....... 359/385, 362, 363, 368, 369, 381, 388, 359/389
See application file for complete search history.

(56) References Cited

FOREIGN PATENT DOCUMENTS

| | | | | |
|---|---|---|---|---|
| CN | 105352926 A | * | 2/2016 | |
| CN | 105352926 A | | 2/2016 | |
| CN | 109031635 A | * | 12/2018 | ......... G02B 21/0032 |

OTHER PUBLICATIONS

First Office Action from China patent office in a counterpart Chinese patent Application 201811108256.9, datled Aug. 12, 2019 (5 pages).
Second Office Action from China patent office in a counterpart Chinese patent Application 201811108256.9, dated Apr. 13, 2020 (3 pages).
Decision to grant patent from China patent office in a counterpart Chinese patent Application 201811108256.9, dated Aug. 14, 2020 (1 page).
Written Opinion of the International Searching Authority for No. PCT/CN2018/117616, dated Apr. 28, 2019.

* cited by examiner

STIMULATED EMISSION DEPLETION SUPER-RESOLUTION MICROSCOPE USING QUICK COMBINATION OF LIGHT BEAMS

CROSS-REFERENCE TO RELATED APPLICATIONS

This application is a continuation of co-pending International Patent Application Number PCT/CN2018/117616, filed on Nov. 27, 2018, which claims the priority and benefit of Chinese patent application No. 201811108256.9 filed on Sep. 21, 2018 with China National Intellectual Property Administration, the entire contents of which are incorporated herein by reference in their entireties.

TECHNICAL FIELD

This disclosure relates to the technical field of microscopic optical imaging, and more particularly relates to a stimulated emission depletion super-resolution microscope.

BACKGROUND

The imaging resolution of optical super-resolution microscopy exceeds the limit of optical diffraction, and is much higher than that of conventional optical microscopes. It has become a research hotspot in recent years and various types have emerged. Stimulated Emission Depletion (STED) microscopy is the first proposed far-field optical microscopy which also directly overcomes the optical diffraction limit. It is based on laser confocal microscopy imaging. Compared with other types of super-resolution microscopy, it has a comparatively faster imaging speed, can image live cells, and can detect even finer structures in biomedical research.

In STED imaging, the excitation light and the depletion light need to be accurately combined, in order that the spots of the two beams after being focused by the objective lens can accurately coincide. Due to factors such as vibration in the surrounding environment, temperature changes, and stress release of mechanical parts, however, the positions of the spots of the excitation light and the depletion light are prone to drift, such that the two light spots no longer precisely coincide, causing the effect of super-resolution imaging to be reduced or wholly disappear.

SUMMARY

In view of this, there is a need to provide a stimulated emission depletion super-resolution microscope using quick combination of light beams, which is capable of quick and high-precision beam combination of the excitation spot and the depletion spot, thus solving the defects in the related art.

To achieve the above objective, the present disclosure adopts the following technical solutions.

There is provided a stimulated emission depletion super-resolution microscope using quick combination of light beams, including: a STED imaging unit and a beam combination test unit.

The STED imaging unit includes a first laser, a first reflection mirror, a second laser, a phase plate, a first dichroic mirror, $\lambda/4$ slide, a second reflection mirror, an XY scanning galvanometer, a scanning lens, a tube lens, a second dichroic mirror, an objective lens, a three-dimensional Nano-stage for placing a sample, an optical filter, a first lens, a pinhole, and a point detector.

The light beam emitted by the first laser is used as excitation light, which is reflected by the first reflection mirror, and enters the first dichroic mirror and further transmits through the first dichroic mirror. The light beam emitted by the second laser is used as depletion light, which transmits through the phase plate and is incident on and reflected by the first dichroic mirror. The excitation light beam transmitted through the first dichroic mirror and the depletion light beam reflected by the first dichroic mirror form a combined light beam.

The beam combination test unit is used to receive the combined light beam and adjust the combined light beam to make the excitation light beam and the depletion light beam accurately coincide.

The light beam that has been accurately coincided enters the $\lambda/4$ slide where the polarization state of the light beam is adjusted by the $\lambda/4$ slide, and then is reflected by the second reflection mirror and enters the XY scanning galvanometer. The light beam emitted from the XY scanning galvanometer sequentially enters the scanning lens and the tube lens. The light beam emitted from the tube lens is transmitted into the objective lens through the second dichroic mirror, and is focused on the sample by the objective lens. The fluorescence emitted by the sample is collected by the objective lens and then transmitted backwards through the objective lens, and is further reflected by the second dichroic mirror and enters the optical filter. The filter suppresses incident laser light and allows the fluorescence to transmit. The transmitted fluorescence enters the first lens, and is focused by the first lens on the pinhole provided at the focal position of the first lens. The light beam exiting from the pinhole enters the point detector, thereby realizing the detection of the STED imaging fluorescence signal.

In some typical embodiments, both the first reflection mirror and the first dichromatic mirror are operative to adjust their respective angles around the XY axes, and the second reflection mirror is removable from the optical path.

In some typical embodiments, the beam combination test unit includes a dichroic prism, a second lens, a first area detector, and a second area detector.

When the beam combination test unit adjusts the combined light beam, the second reflection mirror is removed from the optical path. The combined light beam passes through the $\lambda/4$ slide and is incident on the dichroic prism, which reflects and transmits the incident combined light beam. The emitted reflected light is incident on the first area detector and forms a near-point light spot on the first area detector, and the emitted transmitted light is incident on the second lens and focused on the second area detector and forms a far-point light spot on the second area detector.

With the angle of the first dichroic mirror kept unchanged, the center position Ps1 of the near-point light spot formed by the depletion light on the first area detector is marked and used as a reference position. The angle of the first reflection mirror is adjusted around x-axis or y-axis to change the position Pj1 of the near-point light spot formed by the excitation light on the first area detector, making Pj1 gradually move toward Ps1.

With the angle of the first reflection mirror kept unchanged, the center position Pj2 of the far-point light spot formed by the excitation light on the second area detector is marked and used as a reference position. The angle of the first dichroic mirror is adjusted around the x axis or y axis to change the position Ps2 of the far-point spot formed by the depletion light on the second area detector, making Ps2 gradually move toward Pj2.

The angles of the first reflection mirror and the first dichroic mirror are alternately adjusted so that the spot positions Pj1, Pj2 of the excitation light on the first area detector and the second area detector coincide with the corresponding spot positions Ps1 and Ps2 of the corresponding depletion light on the first area detector and the second area detector, thereby achieving the precise coincidence of the excitation light beam and the depletion light beam.

In some typical embodiments, the phase distribution on the phase plate is a 0-2n spiral distribution.

In some typical embodiments, the point detector is an avalanche diode.

The present disclosure adopting the above technical solutions may have the following advantages.

The STED super-resolution microscope capable of quick beam combination provided by the present disclosure includes a STED imaging unit and a beam combination test unit. The excitation light and the depletion light are accurately combined by the beam combination test unit, so that the imaging light spots of the two light beams passing through the STED imaging unit can accurately coincide with each other, thereby obtaining a better super-resolution imaging effect.

BRIEF DESCRIPTION OF DRAWINGS

For a better understanding of the technical solutions reflected in the embodiments according to the present disclosure or those in the related art, the drawings used in the description of the embodiments or the related art will be briefly introduced below. Apparently, the drawings in the following description merely represent some embodiments of the present disclosure, and for those having ordinary skill in the art, other drawings may also be obtained based on these drawings without investing creative efforts.

DETAILED DESCRIPTION

Hereinafter, technical solutions in the embodiments of the present disclosure will be described in a definite and comprehensive manner in connection with the accompanying drawings in the embodiments of the present disclosure. It is obvious that the embodiments described herein represent merely a part rather than all of the embodiments in accordance with the present disclosure. All other embodiments obtained by a person having ordinary skill in the art based on the embodiments disclosed herein without making creative efforts shall all fall in the scope of protection of the present disclosure.

Figure 1:
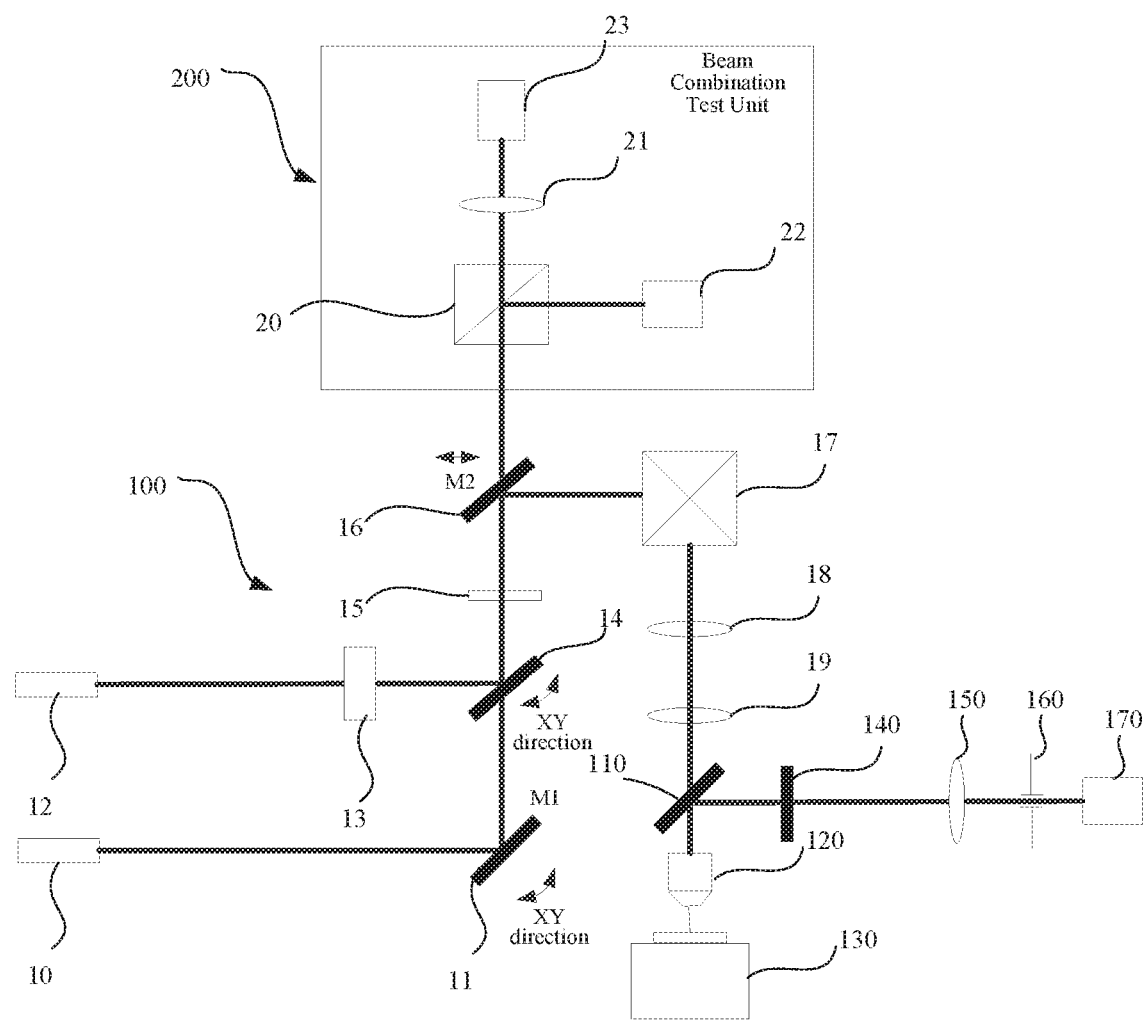
FIG. 1 is a schematic diagram illustrating a STED (stimulated emission depletion) super-resolution microscope capable of quick beam combination provided by an embodiment according to the present disclosure.

FIG. 1 is a schematic diagram illustrating a STED (stimulated emission depletion) super-resolution microscope capable of quick beam combination provided by an embodiment according to the present disclosure. The STED super-resolution microscope includes a STED imaging unit 100 and a beam combination test unit 200.

The STED imaging unit 100 includes a first laser 10, a first reflection mirror 11, a second laser 12, a phase plate 13, a first dichroic mirror 14, a λ/4 slide 15, a second reflection mirror 16, an XY scanning galvanometer 17, a scanning lens 18, a tube lens 19, a second dichroic mirror 110, an objective lens 120, a three-dimensional Nano-stage 130 for placing a sample, an optical filter 140, a first lens 150, a pinhole 160, and a point detector 170.

The working principle of the STED super-resolution microscope capable of quick beam combination provided by this embodiment of the present disclosure is as follows.

The light beam emitted by the first laser 10 is used as excitation light, which is reflected by the first reflection mirror 11, and enters the first dichroic mirror 14 and is transmitted through the first dichroic mirror 14. The light beam emitted by the second laser 12 is used as depletion light, which transmits through the phase plate 13 and enters and is reflected by the first dichroic mirror 14. The excitation light beam transmitted through the first dichroic mirror 14 and the depletion light beam reflected by the first dichroic mirror 14 form a combined light beam.

The beam combination test unit 200 is used to receive the combined light beam and adjust the combined light beam to make the excitation light beam and the depletion light beam accurately coincide.

The light beam that has been accurately coincided enters the λ/4 slide 15 where the polarization state of the light beam is adjusted by the λ/4 slide 15, and then is reflected by the second reflection mirror 16 and enters the XY scanning galvanometer 17. The light beam emitted from the XY scanning galvanometer 17 sequentially enters the scanning lens 18 and the tube lens 19. The light beam emitted from the tube lens 19 is transmitted into the objective lens 120 through the second dichroic mirror 110, and is focused on the sample by the objective lens 120. The fluorescence emitted by the sample is collected by the objective lens 120 and then transmitted backwards through the objective lens 120, and is further reflected by the second dichroic mirror 110 and enters the optical filter 140. The optical filter 140 suppresses incident laser light and allows the fluorescence to transmit. The transmitted fluorescence enters the first lens 150, and is focused by the first lens 150 on the pinhole provided at the focal position of the first lens 150. The light beam exiting from the pinhole 160 enters the point detector 170, thereby realizing the detection of the STED imaging fluorescence signal.

In some typical embodiments, the phase distribution on the phase plate 13 is a 0-2π spiral distribution.

In some typical embodiments, the point detector 170 is an avalanche diode.

In some typical embodiments, both the first reflection mirror 11 and the first dichromatic mirror 14 are operative to adjust their respective angles around the XY axes, and the second reflection mirror 16 are removable from the optical path.

In some typical embodiments, the beam combination test unit 200 includes a dichroic prism 20, a second lens 21, a first area detector 22, and a second area detector 23.

When the beam combination test unit 200 adjusts the combined light beam, the second reflection mirror 16 is removed from the optical path. The combined light beam passes through the λ/4 slide 15 and is incident on the dichroic prism 20, which reflects and transmits the incident combined light beam. The emitted reflected light is incident on the first area detector 22 and forms a near-point light spot on the first area detector 22, and the emitted transmitted light is incident on the second lens 21 and focused on the second area detector 23 and forms a far-point light spot on the second area detector 23.

With the angle of the first dichroic mirror 14 kept unchanged, the center position Ps1 of the near-point light spot formed by the depletion light on the first area detector 22 is marked and used as a reference position. The angle of the first reflection mirror 11 is adjusted around x-axis or y-axis to change the position Pj1 of the near-point light spot formed by the excitation light on the first area detector 22, making Pj1 gradually move toward Ps1.

With the angle of the first reflection mirror 11 kept unchanged, the center position Pj2 of the far-point light spot formed by the excitation light on the second area detector 23 is marked and used as a reference position. The angle of the first dichroic mirror 14 is adjusted around the x axis or y axis to change the position Ps2 of the far-point spot formed by the depletion light on the second area detector 23, making Ps2 gradually move toward Pj2.

The angles of the first reflection mirror 11 and the first dichroic mirror 14 are alternately adjusted so that the spot positions Pj1, Pj2 of the excitation light on the first area detector 22 and the second area detector 23 coincide with the corresponding spot positions Ps1 and Ps2 of the corresponding depletion light on the first area detector 22 and the second area detector 23, thereby achieving the precise coincidence of the excitation light beam and the depletion light beam.

It is to be appreciated that during the above operation, the position Pj1 of the excitation light spot and the position Ps1 of the depletion light spot in the first area detector 22 may be separated from each other. Similarly, the position Pj2 of the excitation light spot and the position Ps2 of the depletion light spot in the second area detector 23 may also be separated. Thus, the angles of the first reflection mirror 11 and the first dichroic mirror 14 may be alternately adjusted until the positions Pj1, Pj2 of the excitation light spots in the first area detector 22 and the second area detector 23 fully coincide with the corresponding positions Ps1, Ps2 of the depletion light spots in the first area detector 22 and the second area detector 23.

Figure 2:
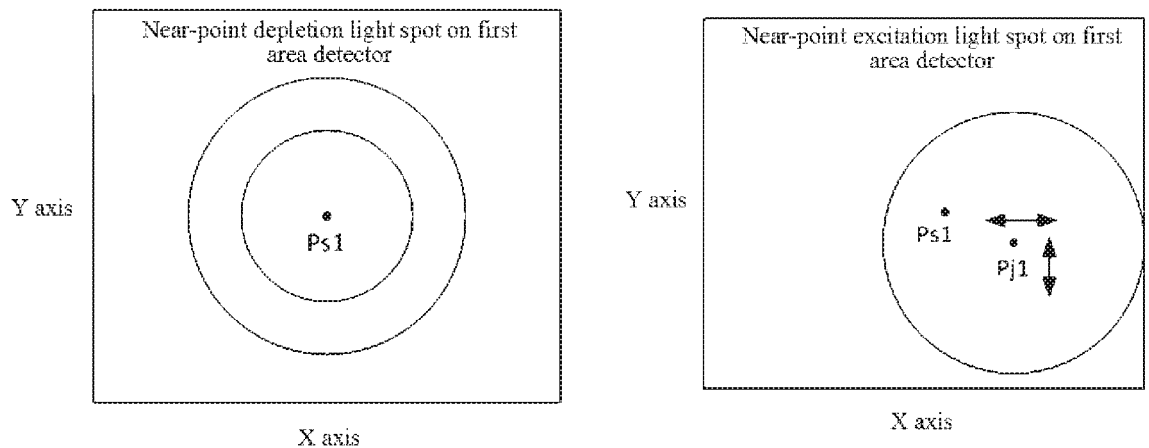
FIG. 2 illustrates the light intensity distribution of the excitation light spot at the focal point of the objective lens of the STED super-resolution microscope capable of quick combination of light beams that is provided by an embodiment according to the present disclosure.
Figure 3:
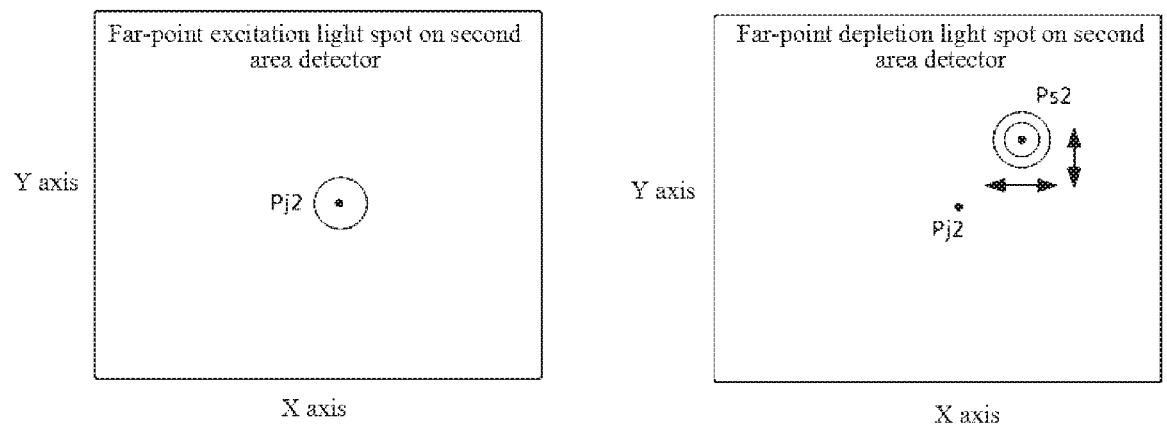
FIG. 3 illustrates the light intensity distribution of the depletion light spot at the focal point of the objective lens of the STED super-resolution microscope capable of quick combination of light beams that is provided by an embodiment according to the present disclosure.

FIG. 2 shows the positions of the near-point light spots formed by the excitation light and the depletion light on the first area detector 22. FIG. 3 shows the positions of the far-point light spots formed by the excitation light and the depletion light on the second area detector 23.

According to the STED super-resolution microscope capable of quick beam combination provided by the present disclosure, the excitation light and the depletion light are accurately combined by the beam combination test unit 200, so that the imaging light spots of the two light beams passing through the STED imaging unit 100 can accurately coincide with each other, thereby obtaining a better super-resolution imaging effect.

Of course, the STED super-resolution microscope capable of quick beam combination according to the present disclosure may also have various changes and modifications, and so will not be limited to the specific structures illustrated in the above embodiments. Thus, the scope of protection of the present disclosure shall include those alterations, substitutions and modifications apparent to those skilled in the art.

What is claimed is:

1. A stimulated emission depletion (STED) super-resolution microscope using quick combination of light beams, comprising a STED imaging unit and a beam combination test unit;

wherein the STED imaging unit comprises a first laser, a first reflection mirror, a second laser, a phase plate, a first dichroic mirror, a $\lambda/4$ slide, a second reflection mirror, an XY scanning galvanometer, a scanning lens, a tube lens, a second dichroic mirror, an objective lens, a three-dimensional Nano-stage configured for placing a sample, an optical filter, a first lens, a pinhole, and a point detector;

wherein a light beam emitted by the first laser is used as an excitation light, which is reflected by the first reflection mirror, and is incident onand transmits through the first dichroic mirror; a light beam emitted by the second laser is used as a depletion light, which transmits through the phase plate and is incident on and reflected by the first dichroic mirror; an excitation light beam transmitted through the first dichroic mirror and a depletion light beam reflected by the first dichroic mirror form a combined light beam;

wherein the beam combination test unit is configured to receive the combined light beam and adjust the combined light beam to make the excitation light beam and the depletion light beam accurately coincide;

wherein the light beam that has been accurately coincided is incident on the slide where a polarization state of the light beam is adjusted by the $\lambda/4$ slide, and is reflected by the second reflection mirror and enters the XY scanning galvanometer; the light beam emitted from the XY scanning galvanometer sequentially enters the scanning lens and the tube lens; the light beam emitted from the tube lens is transmitted into the objective lens through the second dichroic mirror, and is focused on the sample by the objective lens; a fluorescence emitted by the sample is collected by the objective lens and transmitted backwards through the objective lens, and is further reflected by the second dichroic mirror and enters the optical filter; the optical filter suppresses an incident laser light and allows the fluorescence to transmit; the transmitted fluorescence enters the first lens, and is focused by the first lens on the pinhole provided at a focal position of the first lens; the light beam exiting from the pinhole enters the point detector, thus realizing detection of a STED imaging fluorescence signal.

2. The STED super-resolution microscope as recited in claim 1, wherein both the first reflection mirror and the first dichroic mirror are operative to adjust their respective angles around XY axes, and the second reflection mirror is removable from an optical path where it is located.

3. The STED super-resolution microscope as recited in claim 2, the beam combination test unit comprises a dichroic prism, a second lens, a first area detector, and a second area detector;

wherein when adjusting the combined light beam using the beam combination test unit, the second reflection mirror is removed from the optical path, the combined light beam passes through the $\lambda/4$ slide and is incident on the dichroic prism, which reflects and transmits the incident combined light beam; the emitted reflected light is incident on the first area detector and forms a near-point light spot on the first area detector, and the emitted transmitted light is incident on the second lens and focused on the second area detector and forms a far-point light spot on the second area detector;

with an angle of the first dichroic mirror kept unchanged, a center position Ps1 of the near-point light spot formed by the depletion light on the first area detector is marked and used as a reference position; the angle of the first reflection mirror is adjusted around x-axis or y-axis to change a position Pj1 of the near-point light spot formed by the excitation light on the first area detector, making Pj1 gradually move toward Ps1; and with an angle of the first reflection mirror kept unchanged, a center position Pj2 of the far-point light spot formed by the excitation light on the second area detector is marked and used as a reference position; the angle of the first dichroic mirror is adjusted around the x axis or y axis to change a position Ps2 of the far-point spot formed by the depletion light on the second area detector, making Ps2 gradually move toward Pj2; and the angles of the first reflection mirror and the first dichroic mirror are alternately adjusted to make the spot positions Pj1, Pj2 of the excitation light on the first area detector and the second area detector coincide with the corresponding spot positions Ps1 and Ps2 of the depletion light on the first area detector and the second area detector, thereby achieving precise coincidence of the excitation light beam with the depletion light beam.

4. The STED super-resolution microscope as recited in claim 1, wherein a phase distribution on the phase plate is a $0\text{-}2\pi$ spiral distribution.

5. The SLED super-resolution microscope as recited in claim 1, wherein the point detector is an avalanche diode.

* * * * *